(12) United States Patent
Vincent (10) Patent No.: US 12,539,203 B2
(45) Date of Patent: Feb. 3, 2026

(54) PUMP ASSEMBLY

(71) Applicant: Dyson Technology Limited, Wiltshire (GB)

(72) Inventor: Christopher Graham Vincent, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 779 days.

(21) Appl. No.: 17/801,791

(22) PCT Filed: Feb. 8, 2021

(86) PCT No.: PCT/GB2021/050273
§ 371 (c)(1),
(2) Date: Aug. 23, 2022

(87) PCT Pub. No.: WO2021/170968
PCT Pub. Date: Sep. 2, 2021

(65) Prior Publication Data
US 2023/0078152 A1 Mar. 16, 2023

(30) Foreign Application Priority Data
Feb. 27, 2020 (GB) .................................... 2002810

(51) Int. Cl.
*A61C 17/02* (2006.01)
*A46B 11/00* (2006.01)
(Continued)

(52) U.S. Cl.
CPC ...... *A61C 17/0202* (2013.01); *A46B 11/0055* (2013.01); *A61C 1/0092* (2013.01);
(Continued)

(58) Field of Classification Search
CPC .......... A61C 3/025; A61C 15/046–048; A61C 17/02–0202; A61C 17/0211;
(Continued)

(56) References Cited

U.S. PATENT DOCUMENTS 3,233,550 A 2/1966 Smith
3,374,685 A 3/1968 Eheim
(Continued)

FOREIGN PATENT DOCUMENTS

CN 204505179 U 7/2015
GB 1093529 A 12/1967
(Continued)

OTHER PUBLICATIONS

International Search Report and Written Opinion received for PCT Patent Application No. PCT/GB2021/050273, mailed on Mar. 26, 2021, 10 pages.
(Continued)

*Primary Examiner* — Paige Kathleen Bugg
(74) *Attorney, Agent, or Firm* — Tucker Ellis LLP; Michael G. Craig (57) ABSTRACT

A pump assembly for a dental cleaning appliance includes a positive displacement pump including a fluid chamber and a fluid displacement member which is moveable in a linear direction relative to the fluid chamber, and a drive for actuating the pump to draw fluid into the fluid chamber through a fluid inlet. An energy storage device converts kinetic energy generated during actuation of the pump by the drive into potential energy, and stores the potential energy. A cam is connected to the drive for rotation relative to the fluid displacement member. The cam has a ramp extending about the fluid displacement member which is engaged by a cam follower connected to the fluid displacement member. As the cam moves relative to the fluid displacement member,
(Continued)

the cam follower moves along the ramp to actuate the pump to draw fluid into the fluid chamber, and beyond the end of the ramp to enable the energy storage device to use the stored potential energy to actuate the pump to urge fluid from the fluid chamber.

17 Claims, 10 Drawing Sheets

(51) Int. Cl.
    *A61C 1/00*         (2006.01)
    *A61C 17/028*     (2006.01)
    *A61C 17/22*      (2006.01)
    *A61C 17/36*      (2006.01)

(52) U.S. Cl.
    CPC .......... *A61C 17/028* (2013.01); *A61C 17/227* (2013.01); *A61C 17/36* (2013.01)

(58) Field of Classification Search
    CPC .... A61C 17/024–032; A61C 17/16–18; A61C 17/22–228; A61C 17/26–30; A61C 17/34–349; A61C 17/36–38; A46B 11/0055; A61H 13/00–005; A47K 5/1205–1207
    USPC .................................................. 601/162–164
    See application file for complete search history.

(56) References Cited

U.S. PATENT DOCUMENTS

| | | | |
|---|---|---|---|
| 3,513,918 A | | 5/1970 | Coffman et al. |
| 4,820,153 A | | 4/1989 | Romhild et al. |
| 4,828,179 A | * | 5/1989 | Garner ............... F01B 3/02 91/503 |
| 4,984,640 A | | 1/1991 | Gillan et al. |
| 5,472,322 A | * | 12/1995 | Huet ................... F04B 1/12 417/415 |
| 6,159,006 A | * | 12/2000 | Cook ................... A61C 17/02 601/165 |
| 10,022,741 B2 | | 7/2018 | Fuller et al. |
| 2008/0017689 A1 | | 1/2008 | Simonelli et al. |
| 2009/0194576 A1 | | 8/2009 | Wang |
| 2010/0116864 A1 | | 5/2010 | Lamb |
| 2015/0164612 A1 | | 6/2015 | Kloster |
| 2015/0292493 A1 | | 10/2015 | Suzuki |
| 2015/0314433 A1 | | 11/2015 | Fleischer et al. |
| 2016/0025197 A1 | | 1/2016 | Gulyas |
| 2016/0052007 A1 | | 2/2016 | Fuller et al. |
| 2016/0331113 A1 | | 11/2016 | Follows et al. |
| 2018/0084898 A1 | * | 3/2018 | Vincent .............. A46B 11/0062 |
| 2018/0085207 A1 | * | 3/2018 | Tweedie ............. A61C 17/0202 |
| 2018/0289456 A1 | * | 10/2018 | Follows .............. A61C 1/0015 |

FOREIGN PATENT DOCUMENTS

| | | |
|---|---|---|
| GB | 2260289 A | 4/1993 |
| JP | 2008-501412 A | 1/2008 |
| JP | 2015-527101 A | 9/2015 |
| JP | 2016-214851 A | 12/2016 |
| JP | 2018-051310 A | 4/2018 |
| WO | 2016/185162 A1 | 11/2016 |
| WO | 2018/055329 A1 | 3/2018 |

OTHER PUBLICATIONS

Search Report received for GB Application No. 2002810.6, mailed on Jul. 29, 2020, 1 page.

Office Action received for Japanese Patent Application No. 2022-551812, mailed on Sep. 5, 2023, 6 pages (3 pages of English Translation and 3 pages of Original Document).

\* cited by examiner

PUMP ASSEMBLY

CROSS-REFERENCE TO PRIOR APPLICATION

This application is a § 371 National Stage Application of PCT International Application No. PCT/GB2021/050273 filed Feb. 8, 2021, which claims the priority of United Kingdom Application No. 2002810.6, filed Feb. 27, 2020, each of which are herein incorporated by reference in their entirety.

FIELD OF THE INVENTION

The present invention relates to a pump assembly, and to a treatment appliance which includes a pump assembly. The treatment appliance is preferably a handheld treatment appliance, and is preferably a surface treating appliance. In preferred embodiments of the invention, the appliance is a dental treatment appliance. In a preferred embodiment, the appliance is an electric toothbrush having a fluid delivery system for delivering a fluid to the oral cavity of the user. This fluid may be toothpaste, or a fluid for improved interproximal cleaning. Alternatively, the appliance may not include any bristles or other elements for brushing teeth, and may be in the form of a dedicated interproximal treatment appliance.

BACKGROUND OF THE INVENTION

Electric toothbrushes generally comprise a tool which is connected to a handle. The tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush a fluid delivery system for generating a burst of working fluid for interproximal cleaning. For example, WO2018/055329 describes a toothbrush having a handle and a brush head which includes a nozzle from which working fluid is delivered to the oral cavity of the user. A pump assembly draws fluid from a fluid reservoir, and urges working fluid towards the nozzle to deliver a burst of working fluid to the teeth of the user. The pump assembly comprises a positive displacement pump and a drive for actuating the pump. The pump comprises a piston which is moveable relative to a pump housing to draw fluid into a fluid chamber of the pump, and to subsequently eject fluid from the fluid chamber.

Coupling members connect the pump to the drive. A first coupling member is in the form of a drum which is rotated by a motor of the drive. The drum comprises a pair of diametrically opposed pins. A second coupling member comprises an arm which is connected to the piston, and which comprises a seat for receiving one of the pins of the drum. When a first pin is received by the seat, the pump is connected to the drive so that with rotation of the drum the piston moves backwards to draw fluid into the fluid chamber. As fluid is drawn into the fluid chamber, a spring is compressed by the moving piston. The pump is held in a "primed" configuration until the user presses a button, which initiates further rotation of the drum. As the drum rotates, the second pin engages the arm to release the first pin from the seat, and so decouple the pump from the drive. Upon decoupling of the pump from the drive, the spring expands and pushes the piston forwards to urge a burst of working fluid from the pump. As the piston moves forwards, the arm moves with the piston so that the second pin enters the seat to re-couple the pump to the drive.

SUMMARY OF THE INVENTION

In a first aspect, the present invention provides a pump assembly for a dental cleaning appliance, the pump assembly comprising:
  a positive displacement pump comprising a fluid chamber having a fluid inlet connectable to a source of fluid and a fluid outlet, and a fluid displacement member which is moveable in a linear direction relative to the fluid chamber;
  a drive for actuating the pump to draw fluid into the fluid chamber through the fluid inlet;
  an energy storage device for converting kinetic energy generated during actuation of the pump by the drive into potential energy, and storing the potential energy;
  a cam connected to the drive for rotation relative to the fluid displacement member, the cam comprising a ramp extending about the fluid displacement member, the ramp having an end which is spaced from the start of the ramp along said linear direction; and
  a cam follower connected to the fluid displacement member so as to engage the ramp.

As the cam moves relative to the fluid displacement member, the cam follower (i) moves along the ramp to actuate the pump to draw fluid into the fluid chamber, and (ii) moves beyond the end of the ramp to enable the energy storage device to use stored potential energy to actuate the pump to urge a burst of fluid from the fluid chamber.

The use of a cam and cam follower arrangement connecting the pump to the drive so as to sequentially draw fluid into the fluid chamber and expel fluid from that chamber can provide a compact pump assembly which can reliably switch between the different actuation states of the pump. During a single 360° rotation of the cam relative to the fluid displacement member, the interaction between the cam follower and cam results in (i) movement of the cam follower along the ramp to move the fluid displacement member relatively slowly in a first linear direction to draw fluid into the fluid chamber, and (ii) movement of the cam follower beyond the end of the ramp so that the energy storage device can urge the fluid displacement member to move relatively rapidly in a second linear direction, opposite to the first linear direction, to urge a burst of fluid from the fluid chamber. Each burst of working fluid preferably has a volume which is less than 1 ml, more preferably less than 0.5 ml, and in a preferred embodiment is in the range from 0.04 to 0.2 ml.

The energy storage device is preferably arranged to apply a force to the fluid displacement member which biases the cam follower in a direction extending towards the ramp. This force urges the cam follower against the ramp as the cam rotates about the fluid displacement member. As the cam follower moves away from the end of the ramp, the force applied by the energy storage device to the fluid displacement member causes the cam follower to move in the linear direction relative to the cam so that it returns to the start of the ramp. The energy storage device is preferably in the form of a spring, but alternatively it may be in the form of an accumulator. The energy storage device is preferably arranged to engage the fluid displacement member. When the energy storage device is in the form of a spring, the spring becomes compressed as the fluid displacement member moves relative to the fluid chamber to draw fluid into the chamber. As the cam follower moves beyond the end of the ramp, the spring rapidly expands and urges movement of the fluid displacement member in a reverse direction to urge fluid from the fluid chamber.

The ramp preferably faces away from the fluid chamber. The cam is thus preferably located between the cam follower and the fluid chamber.

The appliance preferably comprises a control circuit which is arranged to actuate the drive. The control circuit may be arranged to stop the rotation of the cam immediately after a burst of fluid has been ejected from the fluid chamber, and so with the cam follower positioned at or adjacent the start of the ramp. In this case, when a burst of fluid is required the cam requires rotation to first move the cam follower along the ramp to draw fluid into the fluid chamber, and then move the cam follower beyond the end of the ramp so that a burst of fluid is urged from the fluid chamber. This positioning of the cam follower at the start of the ramp results in the pump assembly being held in an "unprimed" or empty, configuration following the ejection of fluid from the fluid chamber. As this results in a relatively long time delay between the start of the rotation of the cam and the delivery of a burst of fluid from the fluid chamber, the drive is preferably arranged to stop the rotation of the cam at an angular position at which the cam follower is located adjacent the end of the ramp, and thus following the movement of the cam follower along the ramp to fill the fluid chamber. This can allow the pump assembly to be held in a "primed" or full, configuration so that a burst of fluid can be output from the fluid chamber relatively rapidly, for example, within less than 0.5 seconds from user demand.

The drive or the control circuit may comprise a sensor for detecting the position of a moving component of the pump assembly. For example, the sensor may be arranged to detect the angular position of any one of the cam, the track, or a rotor of a motor of the drive. Alternatively, the sensor may be arranged to detect the linear position of the fluid displacement member. The sensor may be an optical sensor for detecting the position of a datum feature on the moving component. Alternatively, the sensor may be a magnetic sensor, such as a Hall Effect sensor, for detecting the position of a magnet mounted on the moving component. In a preferred embodiment, a magnet is located on the cam, and the sensor is located on the control circuit, which is positioned adjacent to, or mounted on, the pump assembly.

The ramp preferably comprises a relatively steep section which extends from the start of the ramp towards the end of the ramp. This relatively steep section of the ramp may have a substantially uniform gradient along its length. Alternatively, the gradient may vary along the length of this section of the ramp so that the torque required to move the cam follower along this section of the ramp is relatively uniform. The relatively steep section of the ramp preferably extends at least 180° about the rotational axis of the cam, more preferably at least 270° about the rotational axis of the cam.

The ramp preferably comprises a relatively shallow section located adjacent the end of the ramp. The relatively shallow section is preferably located between the end of the ramp and the relatively steep section of the ramp, such that the gradient of the ramp transitions from relatively steep to relatively shallow at a position intermediate the start and the end of the ramp. When the drive is arranged to stop the rotation of the cam so that the cam follower is located on this relatively shallow section of the ramp, this can reduce the initial torque required to restart the rotation of the cam when the drive is actuated to initiate fluid ejection from the pump. It can also inhibit back driving of the drive which can result from stopping the rotation of the cam whilst the cam follower is located on a relatively steep section of the ramp; without this relatively shallow section it would be necessary to constantly activate the drive to maintain the cam follower in a fixed position relative to the ramp. An alternative solution to inhibiting back driving is to provide a notch or other detent at the position of the ramp where the pump is held in a primed configuration, but the subsequent movement of the cam follower out from the notch can increase the amount of torque required to re-start the movement of the cam follower along the ramp.

The relatively shallow section of the ramp is preferably substantially flat, that is, arranged substantially perpendicular to the rotational axis of the cam. The relatively steep section of the ramp preferably extends at no more than 90° about the rotational axis of the cam, preferably between 45 and 90° about the rotational axis of the cam.

The start of the ramp may be located directly beneath the end of the ramp. In other words, the ramp may extend 360° about the fluid displacement member. Alternatively, the start of the ramp may be angularly spaced from the end of the ramp. In other words, the ramp may extend less than 360° about the fluid displacement member. In this case, the cam may comprise a relatively flat track along which the cam follower moves before reaching the start of the ramp, or a relatively steeply declining track extending between the end of the ramp and the start of the ramp. The angular spacing between the end of the ramp and the start of the ramp may depend on, for example, the size and/or shape of the cam follower.

As discussed above, the cam may comprise a single ramp extending no more than 360° about the rotational axis of the cam. However, the cam may comprise a plurality of ramps each extending partially about the rotational axis of the cam. Each ramp may have substantially the same shape, and so extend about the rotational axis of the cam by the same amount. For example, the cam may comprise two ramps which each extend no more than 180° about the rotational axis of the cam, with the start of one ramp being located angularly adjacent, but axially spaced from, the end of the other ramp. In this case, providing two ramps can allow a burst of fluid to be ejected from the pump assembly following a 180° rotation of the cam, or two bursts of fluid to be ejected in rapid succession following a 360° rotation of the cam. Depending on the gradients of the ramp, the volume of the fluid ejected from the pump as the cam follower moves beyond the end of each ramp may be the same or less than that ejected when the cam comprises a single ramp extending substantially fully about the rotational axis of the ramp. For example, multiple, relatively small bursts of fluid may be ejected during a single 360° rotation of the cam. Alternatively, the pump assembly may be returned more rapidly to a primed configuration following ejection of a single burst of fluid. Where multiple ramps are provided, each ramp may comprise a relatively steep section and a relatively shallow section as described above, but with the angular extents of these sections reduced accordingly.

The cam follower preferably comprises a circular bearing which is mounted on an axle extending perpendicular to the rotational axis of the cam.

The drive preferably comprises a motor and a transmission connected between the motor and the cam. The motor is preferably arranged so that a rotor of the motor is rotatable about an axis which is collinear with the rotational axis of the cam. In other words, the pump assembly may have an "in line" configuration, in which the rotor of the motor and the cam are rotatable about a common axis, and the fluid displacement member is moveable along this common axis. This can further provide for a compact pump assembly, which is shaped to be accommodated within a handle of a handheld dental treatment appliance. The transmission comprises an epicyclic gearbox having an output which is connected directly to the cam.

In a preferred embodiment, the positive displacement pump is in the form of a piston pump, in which the fluid displacement member comprises a piston which is reciprocally movable within the fluid chamber to draw fluid into the fluid chamber and to subsequently urge that fluid from the fluid chamber. The piston preferably comprises a piston shaft extending towards the drive from a piston head, and the cam follower is preferably mounted on the piston shaft. The cam preferably surrounds the piston shaft, which preferably has a longitudinal axis which is collinear with the rotational axis of the cam.

The pump preferably comprises a diaphragm located between the fluid chamber and the fluid displacement member. The fluid displacement member, and preferably a head of the fluid displacement member, preferably engages the diaphragm to vary the volume of the fluid chamber with movement of the fluid displacement member relative to the fluid chamber.

In a second aspect the present invention provides a dental treatment appliance comprising:
a handle;
a fluid reservoir for storing a working fluid; and
a fluid delivery system for receiving working fluid from the fluid reservoir, and for delivering working fluid to the oral cavity of a user;
wherein the fluid delivery system comprises a pump assembly as aforementioned.

Features described above in connection with the first aspect of the invention are equally applicable to the second aspect of the invention, and vice versa.

BRIEF DESCRIPTION OF THE DRAWINGS

Preferred features of the invention will now be described, by way of example only, with reference to the accompanying drawings, in which.

DETAILED DESCRIPTION OF THE INVENTION

Figure 1A:
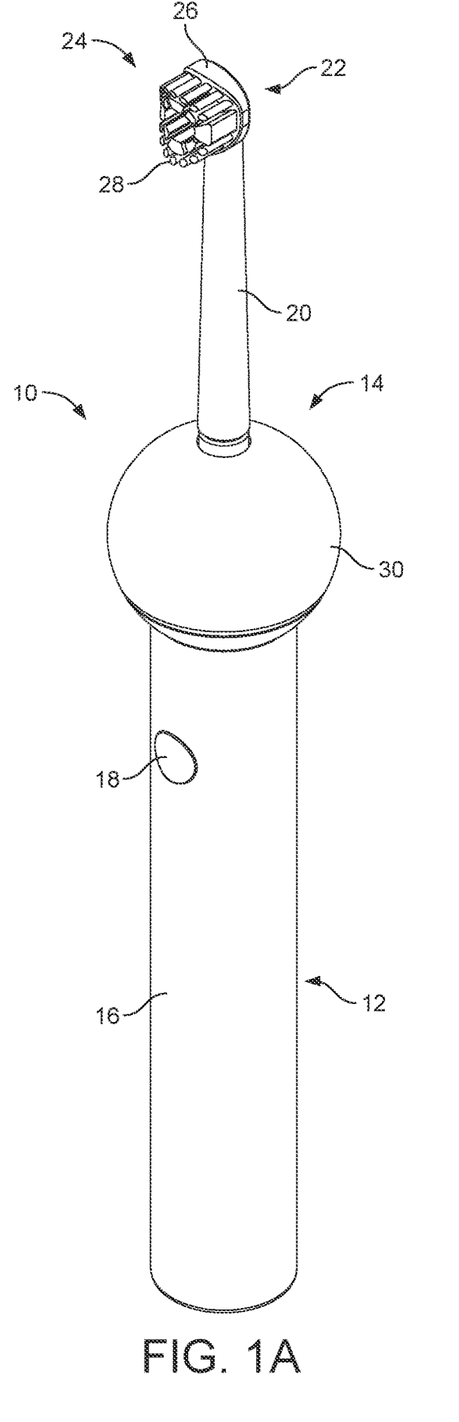
FIG. 1(a) is a perspective view, from the front, of a dental treatment appliance.
Figure 1B:
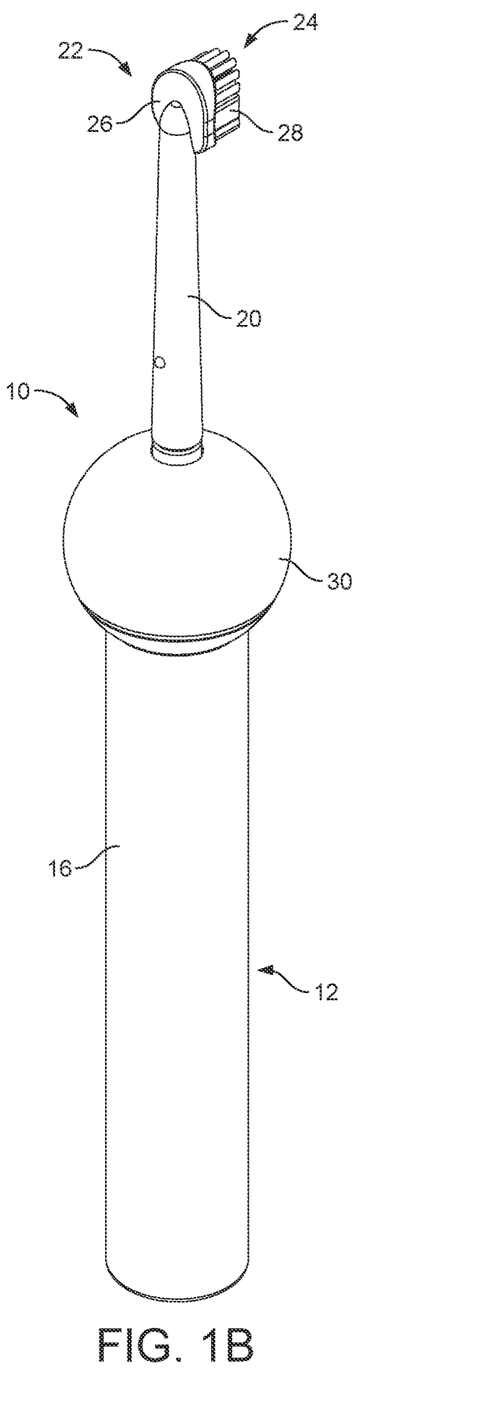
FIG. 1(b) is a perspective view, from the rear, of the appliance.

FIGS. 1(a) and 1(b) illustrate external views of an embodiment of a dental treatment appliance 10. In this embodiment, the appliance is in the form of a handheld appliance, which is in the form of an electric toothbrush having an integrated assembly for dispensing a working fluid for interproximal cleaning, gum treatment or tooth whitening.

The appliance 10 comprises a handle 12 and a cleaning tool 14. The handle 12 comprises an external body 16 which is preferably formed from plastics material. The body 16 is generally cylindrical in shape. The handle 12 comprises a user interface. The user interface comprises a user operable button 18 which is located within an aperture formed in the body 16 so as to be depressible by the thumb of a hand which is gripping the body 16 of the handle 12. Optionally, the handle 12 may comprise a display which is positioned so as to be visible to a user during use of the appliance. The appliance 10 may be connectable to a remote display, such as a display of a personal device or mobile telephone, to enable the user to select operating modes or parameters for the appliance 10 using the button 18 and/or the remote display, as described in more detail below.

The cleaning tool 14 comprises a stem 20 and a head 22. The stem 20 is elongate in shape, which serves to space the head 22 from the handle 12 to facilitate user operability of the appliance 10. In this embodiment, the head 22 of the cleaning tool 14 comprises a brush unit 24, which comprises a bristle carrier 26 and a plurality of sets of bristles 28 mounted on the bristle carrier 26. In this embodiment, the brush unit 24 is rigidly connected to the stem 20. However, in other embodiments the cleaning tool 14 may be provided without a brush unit 24 so that the appliance is in the form of a dedicated oral treatment appliance, for example for cleaning between the gaps in the user's teeth, or for delivering a cleaning or whitening fluid to the oral cavity.

Figure 2:
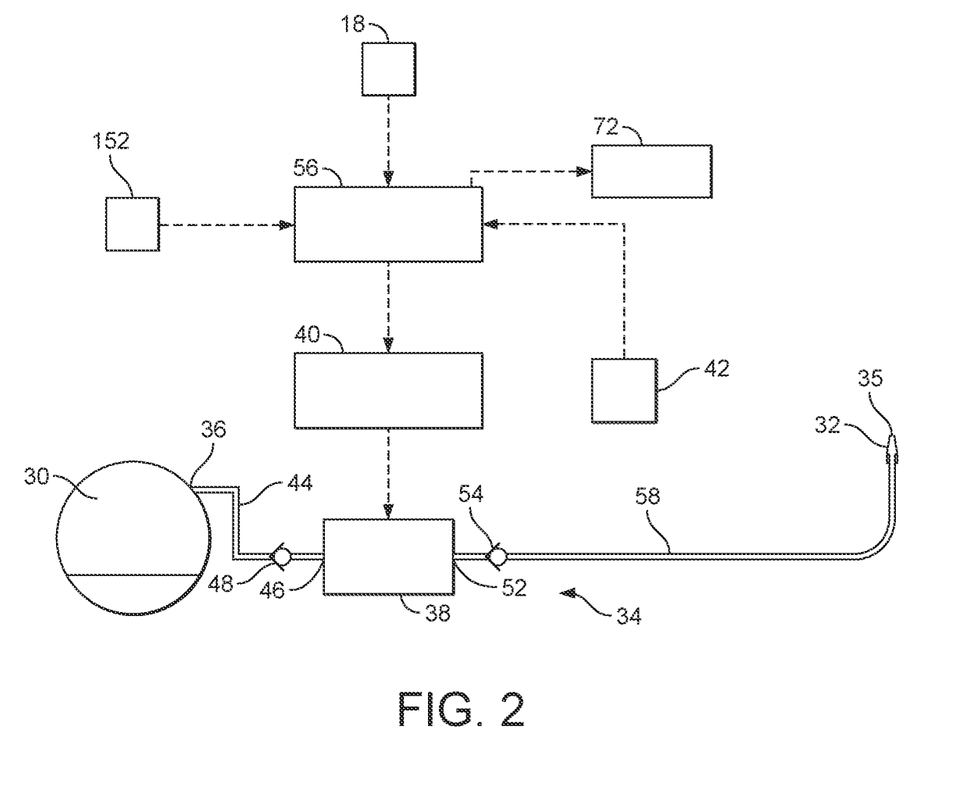
FIG. 2 is a schematic illustration of a fluid delivery system of the appliance.

With reference also to FIG. 2, the appliance 10 also comprises a fluid reservoir 30 for storing a working fluid, and a nozzle 32 for delivering working fluid to the oral cavity of the user during use of the appliance 10. The working fluid is preferably a liquid working fluid, and in this embodiment is water. The fluid reservoir 30 is mounted on the handle 12 so as to extend about an end of the handle 12. The nozzle 32 is mounted on the head 22 of the cleaning tool 14. In this embodiment which includes a brush unit 24, the bristles 28 are arranged around the nozzle 32.

The nozzle 32 forms part of a fluid delivery system 34 for receiving working fluid from the fluid reservoir 30 and for delivering bursts of working fluid to the oral cavity of a user during use of the appliance 10. Each burst of working fluid preferably has a volume which is less than 1 ml, more preferably less than 0.5 ml, and in this embodiment is preferably in the range from 0.04 to 0.2 ml. The fluid delivery system 34 is illustrated schematically in FIG. 3. In overview, the tip of the nozzle 32 comprises a fluid outlet 35 through which a burst of working fluid is delivered to the oral cavity of the user. The fluid delivery system 34 comprises a fluid inlet 36 for receiving working fluid from the fluid reservoir 30. In this embodiment, the working fluid is a liquid working fluid, which is preferably water. The fluid inlet 36 is positioned on the handle 12, preferably on the end of the body 16 of the handle 12, and is arranged to connect to a fluid port of the fluid reservoir 30 when the fluid reservoir 30 is connected to the handle 12. The cleaning tool 14 is detachable from the handle 12, and the fluid reservoir 30 can be pulled away from the handle 12 for replenishment once the cleaning tool 14 has been detached from the handle 12.

The fluid delivery system 34 comprises a pump assembly for drawing working fluid from the fluid reservoir 30 through the fluid inlet 36, and for delivering a burst of working fluid to the nozzle 32. The pump assembly is located within the body 16 of the handle 12, and comprises a positive displacement pump 38 and a drive for driving the pump 38. The drive preferably comprises a pump motor 40. A battery 42 for supplying power to the pump motor 40 is also located in the handle 12. The battery 42 is preferably a rechargeable battery.

A first conduit 44 connects the fluid inlet 36 of the fluid delivery system 34 to a fluid inlet 10 46 of the pump 38. A first one-way valve 48 is located between the fluid inlet 36 and the pump 38 to prevent water from returning to the fluid reservoir 30 from the pump 38. A second conduit 58 connects a fluid outlet 52 of the pump 38 to the nozzle 32. A second one-way valve 54 is located between the pump 38 and the nozzle 32 to prevent water from returning to the pump 38. A control circuit 56 controls the actuation of the pump motor 40, 15 and so the pump motor 40 and the control circuit 56 provide a drive for driving the pump 38. The battery 42 supplies power to the control circuit 56. The control circuit 56 includes a motor controller which supplies power to the pump motor 40.

In this embodiment, the control circuit 56 receives signals generated when the user depresses the button on the handle 12 of the appliance 10. Alternatively, or additionally, the control circuit 56 may receive signals which are generated by a sensor located within the appliance 10, or which are received from a remote device, such as a display or a personal device. For brevity, in the following description the control circuit 56 receives signals which are generated when the user operates the button 18.

The appliance 10 comprises a drive mechanism for driving the movement of the stem 20, and thus the bristle carrier 26, relative to the handle 12. The drive mechanism comprises a transmission unit and a drive unit for driving the transmission unit to move the stem 20 relative to the handle 12. The drive unit comprises a drive motor 72 which is located within the body 16 of the handle 12. The control circuit 56 includes a motor controller which supplies power to the drive motor 72. The button 18 may also be used to activate and deactivate the drive motor 72, for example by depressing the button 18 a predefined number of times within a preset time period, to start, and subsequently stop, a cleaning session. Alternatively, a separate button (not shown) may be provided for activating and deactivating the drive motor 72. The transmission unit comprises a shaft which is driven by the drive unit to oscillate relative to the handle 12. The drive unit is preferably arranged to oscillate the shaft so that it oscillates about the longitudinal axis of the handle 12, preferably at a frequency in the range from 200 to 300 Hz. The stem 20 of the cleaning tool 14 is mounted on the end of the shaft.

Figure 3:
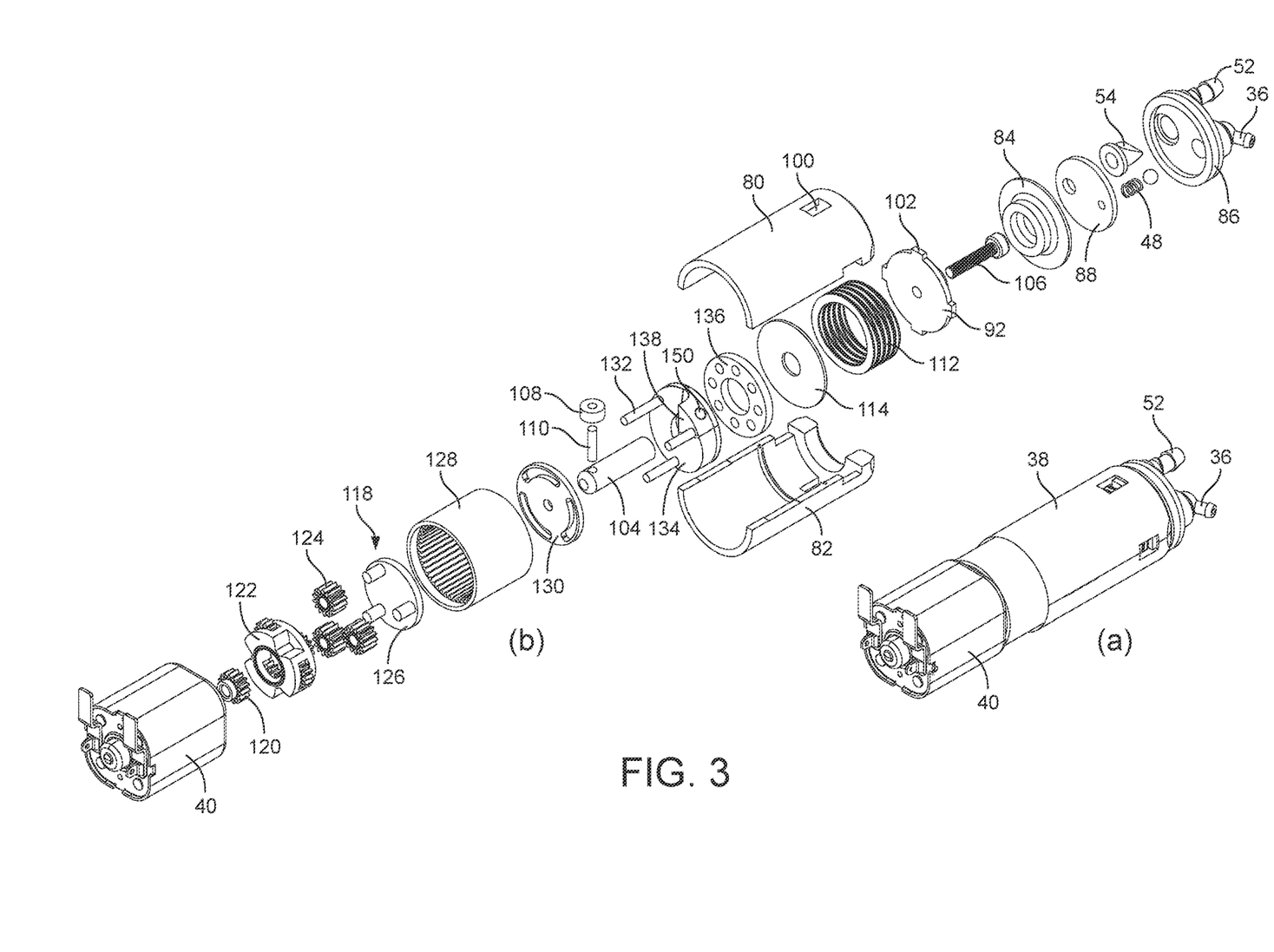
FIG. 3(a) is a perspective view of a pump assembly of the fluid delivery system.
FIG. 3(b) is an exploded view of the pump assembly.

FIGS. 3(*a*) and 3(*b*) illustrate the pump assembly in more detail. The pump 38 comprises a pump housing, which in this embodiment comprises an upper housing section 80 and a lower housing section 82. The housing sections together define a cylindrical cavity which receives the cylindrical section of a rolling diaphragm 84. A radial flange of the rolling diaphragm 84 is sandwiched between the pump housing and a valve housing 86 to form a seal therebetween. The valve housing 86 houses the first one-way valve 48 and the second one-way valve 54, and defines the fluid inlet 46 and the fluid outlet 52 of the pump 38. In this embodiment, the first one-way valve 48 is in the form of a spring-loaded ball check valve, and the second one-way valve 54 is in the form of a duckbill valve. The valves are retained within the valve housing 86 by a valve retainer 88, which is in the form of a circular plate.

Figure 5:
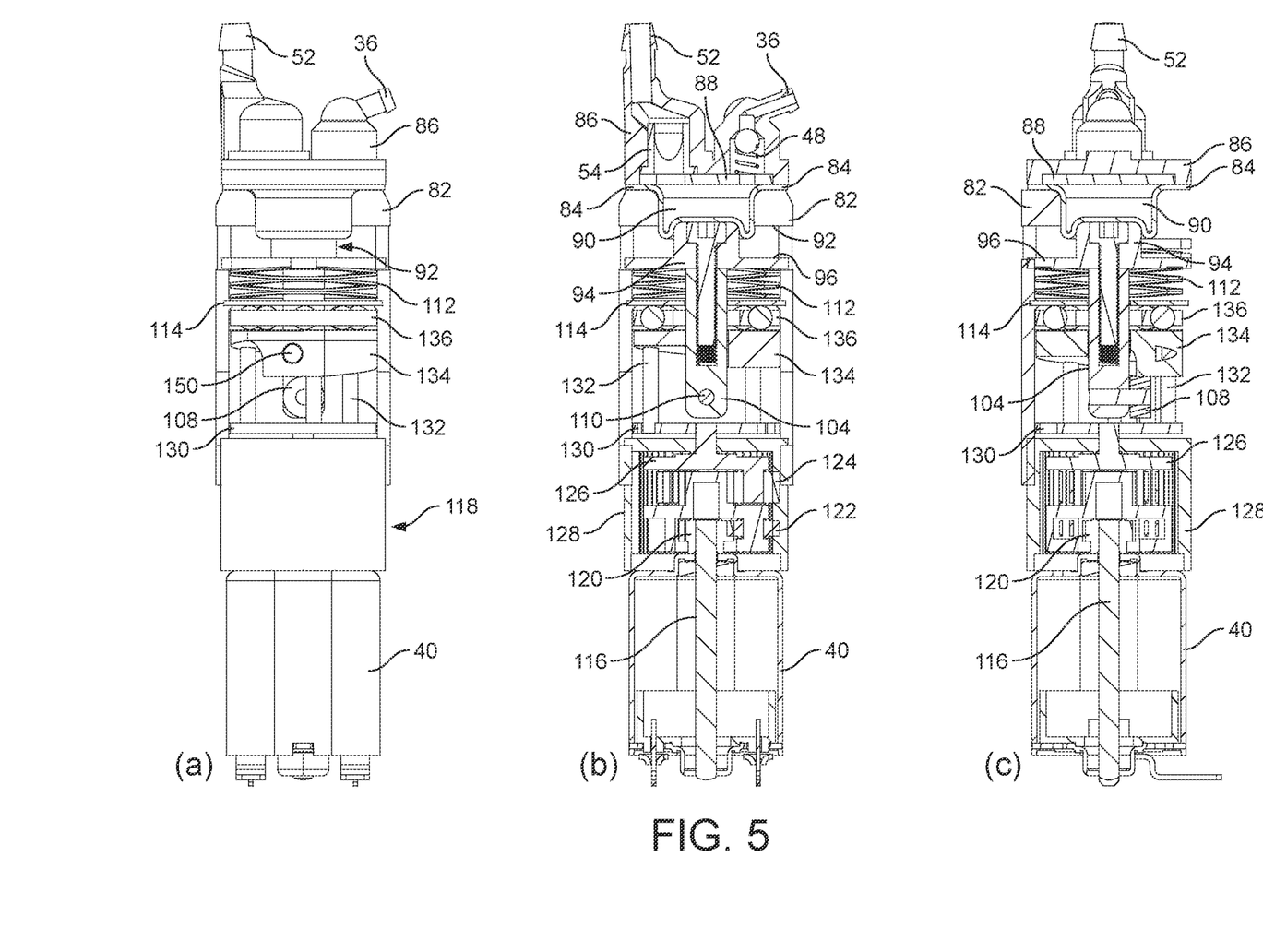
FIG. 5(a) is a side view of the pump assembly with part of the pump housing removed, with a cam follower located adjacent the end of a ramp of the cam.
FIG. 5(b) is a front sectional view of the pump assembly of FIG. 5(a)
FIG. 5(c) is a side sectional view of the pump assembly of FIG. 5(a)

With reference also to FIGS. 5(*a*) to 5(*c*), a fluid chamber 90 for receiving fluid through the fluid inlet 46, and from which fluid is ejected through the fluid outlet 52, is defined between the rolling diaphragm 84 and the valve retainer 88. The valve retainer 88 comprises apertures which allow working fluid to pass into the fluid chamber 90 from the fluid inlet 46, and to pass out of the fluid chamber 90 to the fluid outlet 52.

The volume of the fluid chamber 90 is varied through elastic deformation of the rolling diaphragm 84 by a piston. The piston is reciprocally moveable in a linear direction relative to the pump housing, and thus relative to the fluid chamber 90, to draw fluid into the fluid chamber 84, and subsequently to urge fluid from the fluid chamber 84 towards the nozzle 32. The piston comprises a piston head 92 which has a central portion 94 which engages the rolling diaphragm 84, and a flange 96 which is arranged to engage an axial-facing wall 98 of the pump housing to restrict movement of the piston towards the valve retainer 88. The pump housing comprises a plurality of slots 100 for receiving tabs 102 located on the outer periphery of the flange 96 to guide the movement of, and maintain alignment of, the piston relative to the pump housing. Engagement between the tabs 102 and the peripheral walls of the slots 100 can also restrict the movement of the piston away from the valve retainer, and thus limit the maximum volume of the fluid chamber 90.

The piston further comprises a piston shaft 104 which is connected to the piston head 92 by bolt 106. The piston shaft 104 extends along the direction of linear movement of the piston. A cam follower 108 is mounted on the piston shaft 104 to couple the piston to the drive of the pump assembly. In this embodiment, the cam follower 108 is in the form of a bearing which is rotatably mounted on an axle 110 extending radially outward from the piston shaft 104.

The pump 38 also comprises an energy storage device which converts kinetic energy generated during the actuation of the pump 38 by the drive into potential energy which is stored by the energy storage device. In this embodiment, the energy storage device is in the form of a spring 112 provided within the pump housing. The spring 112 is a compression spring. As shown in FIG. 5(*b*), the spring 112 has a first end which engages the piston head 92, and a second end which engages a first surface of an annular thrust plate 114 which is retained within a groove formed on the inner surface of the pump housing so as to maintain a fixed position within the pump housing as the piston moves relative to the pump housing. This engagement between the spring 112 and the thrust plate 114 causes the spring 112 to urge the piston towards the valve retainer 88.

As mentioned above, the drive comprises a pump motor 40. The pump motor 40 comprises a rotor including a drive shaft 116 which is rotated by the pump motor 40. The pump motor 40 is arranged such that the rotational axis of the drive shaft 116 is collinear with the longitudinal axis of the piston shaft 104. A transmission 118 connected to the pump motor 40 is in the form of a two-stage epicyclic gearbox comprising a sun gear 120 connected to the drive shaft 116, a primary planet gear stage 122, a secondary planet gear stage 124 mounted on an output carrier 126, and a ring gear 128 surrounding the two planet gear stages.

A drive plate 130 is connected to the output carrier 126 of the transmission 118 for rotation about the longitudinal axis of the piston. The drive plate 130 is connected by drive pins 132 to an annular cam 134 which surrounds the piston shaft 104, and which is rotatable about a rotational axis which is collinear with the longitudinal axis of the piston. The cam 134 is supported for rotation relative to the piston shaft 104 by a thrust bearing 136 which is located between the cam 134 and the thrust plate 114. The cam 134 comprises a planar upper surface which faces towards and engages the thrust bearing 136, and a profiled lower surface which faces away from the fluid chamber 90, and upon which a ramp 138 is formed. The ramp 138 defines a cam track against which the cam follower 108 is urged under the biasing force of the spring 112, and along which the cam follower 108 moves with rotation of the cam 134 about the piston.

Figure 4:
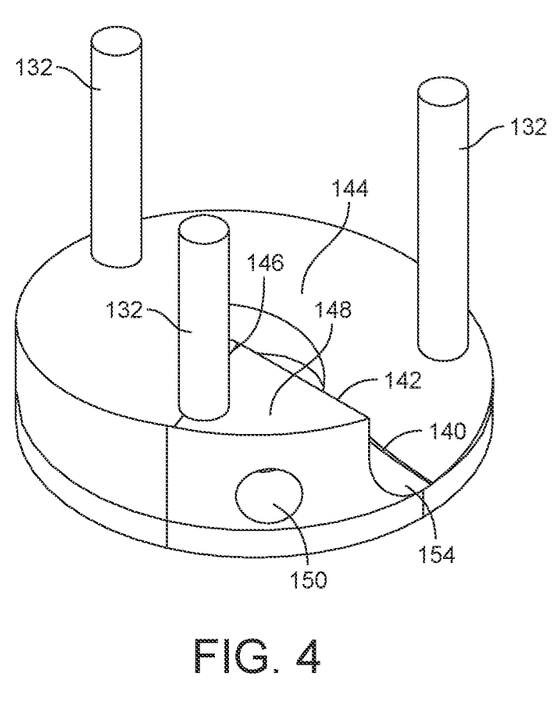
FIG. 4 is a perspective view of a cam of the pump assembly.

The profile of the ramp 138 is illustrated in FIG. 4. The ramp 138 extends about the rotational axis of the cam 134 such that the start 140 of the ramp 138 is both angularly and axially spaced from the end 142 of the ramp 138. The pins 132 are arranged about the ramp 138. The angular spacing between the start 140 and the end 142 of the ramp 138, as measured in an angular direction extending along the ramp 138 is no more than 360°, and in this embodiment is between 270 and 360°. The ramp 138 comprises a relatively steep section 144 which extends helically about the rotational axis of the cam 134 from the start 140 of the ramp 138 to an intermediate position 146 on the ramp 138. The relatively steep section 144 has a uniform gradient along its length, but the gradient may vary so that the torque required to move the cam follower 108 along the ramp 138 is relatively uniform. The ramp 138 also comprises a relatively shallow section 148 extending from the intermediate position 146 to the end 142 of the ramp 138. In this embodiment, the relatively shallow section 148 is substantially flat, that is, arranged substantially perpendicular to the rotational axis of the cam 134 and parallel to the upper surface of the cam 134.

The control circuit 56 is arranged to actuate the drive to control the angular position of the cam 134 relative to the piston. In this embodiment, the control circuit 56 is arranged to monitor the angular position of the cam 134, and to control the actuation of the drive depending on the monitored angular position. As illustrated in FIG. 3, a magnet 150 is mounted on the cam 134 for motion therewith about the rotational axis of the cam 134. A sensor 152, preferably a Hall Effect sensor, is located adjacent the pump assembly and outputs signals to the control circuit 56 which are dependent upon the position of the magnet 150 relative to the sensor 152. The sensor 152 may be mounted on the control circuit 56, which may be positioned adjacent to, or on, the pump assembly. As an alternative, the magnet 150 may be mounted on the piston shaft 104, and the sensor 152 may output a signal which varies with the axial position of the piston, depending on which the control circuit 56 controls the actuation of the drive.

In FIGS. 5(*a*) to 5(*c*), the pump assembly is illustrated in a "primed" configuration which is adopted following the initial filling of the fluid chamber 90 with working fluid, or following the replenishment of the fluid chamber 90 subsequent to the ejection of a burst of working fluid from the pump assembly. The filling of the fluid chamber 90 with working fluid is described in more detail below. In this configuration, the cam 134 is located at a position at which the cam follower 108 is located on the relatively shallow section 148 of the ramp 138, adjacent to the end 142 of the ramp 138, resulting in the piston being located at a maximum axial distance from the valve retainer 88 to maximize the volume of the fluid chamber 90. In this configuration, the maximum volume of working fluid drawn into the fluid chamber 90 is in the range from 0.04 to 0.20 ml. In view of the position of the piston relative to the pump housing, the spring 112 is in a compressed state, in which potential energy is stored by the spring 112.

Figure 6:
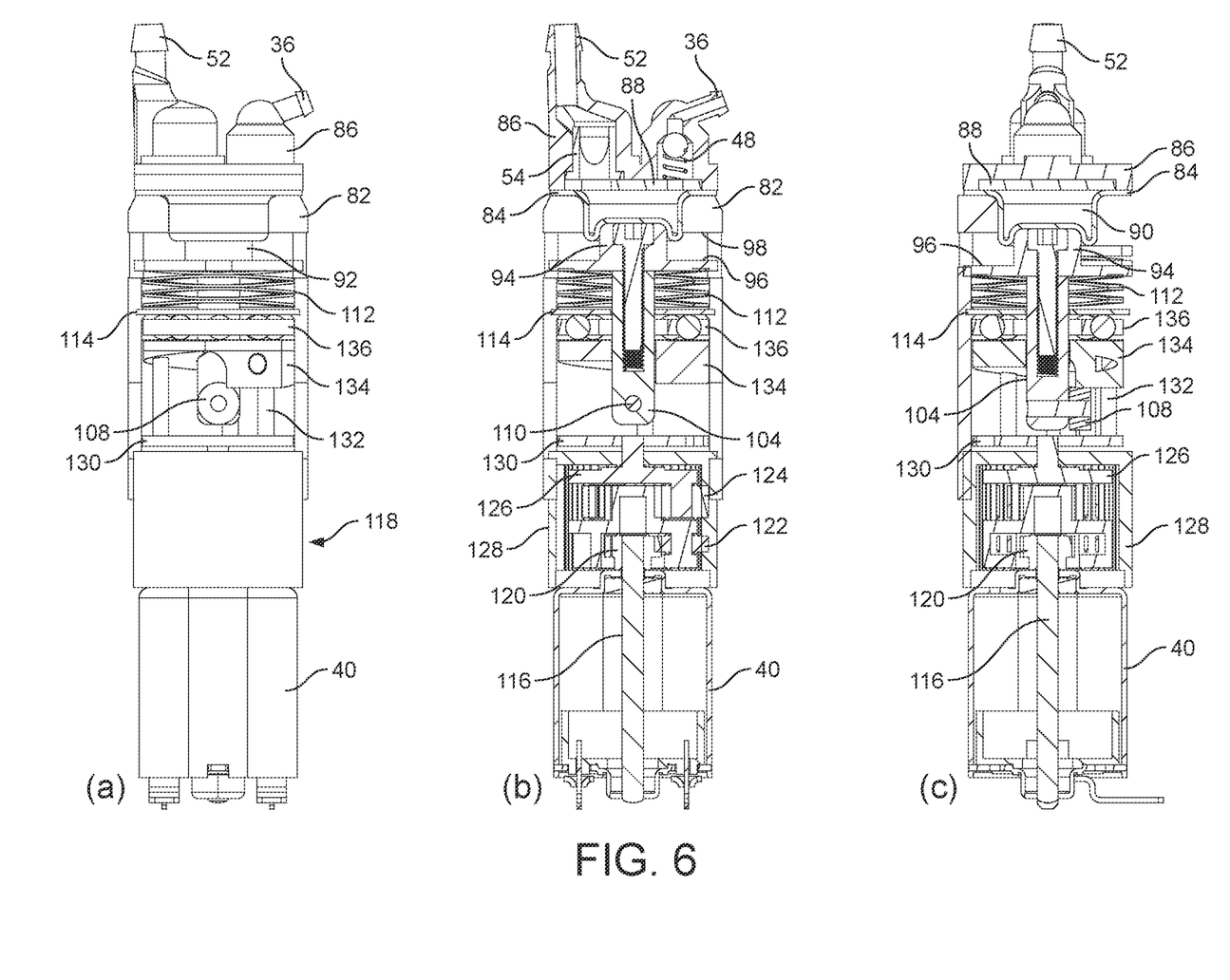
FIG. 6(a) is a side view of the pump assembly with part of the pump housing removed, with the cam follower located just beyond the end of the ramp.
FIG. 6(b) is a front sectional view of the pump assembly of FIG. 6(a)
FIG. 6(c) is a side sectional view of the pump assembly of FIG. 6(a)
Figure 7:
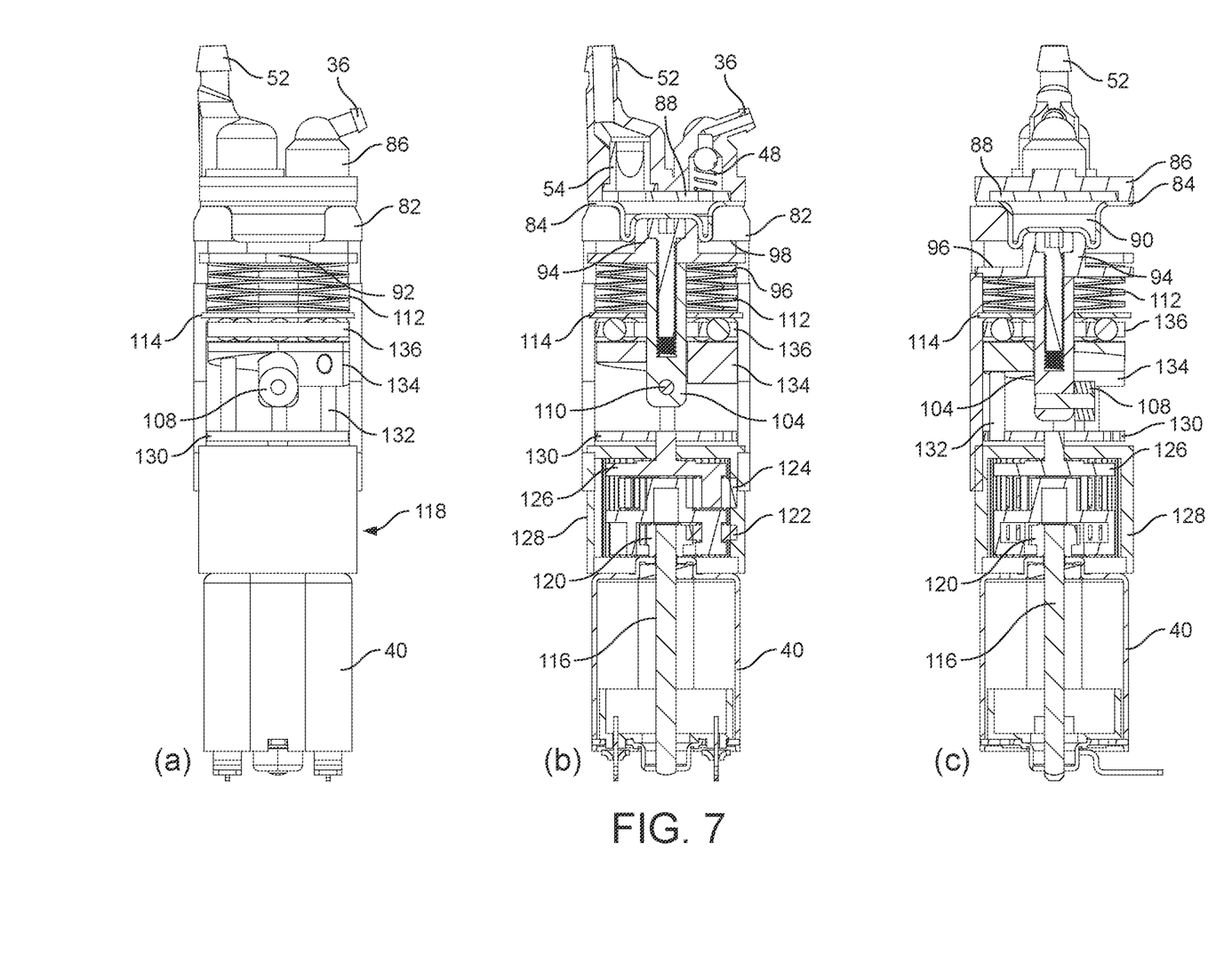
FIG. 7(a) is a side view of the pump assembly with part of the pump housing removed, with the cam follower located midway between the end of the ramp and the start of the ramp.
FIG. 7(b) is a front sectional view of the pump assembly of FIG. 7(a)
FIG. 7(c) is a side sectional view of the pump assembly of FIG. 7(a)

When the user operates the button 18 of the handle 12 to actuate the delivery of a burst of working fluid from the nozzle 32, the control circuit 56 operates the pump motor 40 to rotate the cam 134 through a 360° rotational movement, and in a direction which moves the cam follower 108 over the end of the ramp 138 towards the start 140 of the ramp 140. Upon the rotation of the cam 134 about the piston, the cam follower 108 starts to move along the relatively shallow section 148 of the ramp 138 to the end 142 of the ramp 138, as illustrated in FIGS. 6(*a*) to 6(*c*). Under the action of the spring 112 which urges the cam follower 108 towards the lower surface of the cam 134, continued rotation of the cam 134 about the piston causes the cam follower 108 to move beyond the end 142 of the ramp 138 and engage a relatively steeply declining track 154 extending between the end 142 of the ramp 138 and the start 140 of the ramp 138. With reference to FIGS. 7(*a*) to 8(*c*), movement of the cam follower 108 along this track 154 enables the spring 112 to use stored potential energy to expand and actuate the pump 38 to urge a burst of working fluid through the fluid outlet 52.

Figure 8:
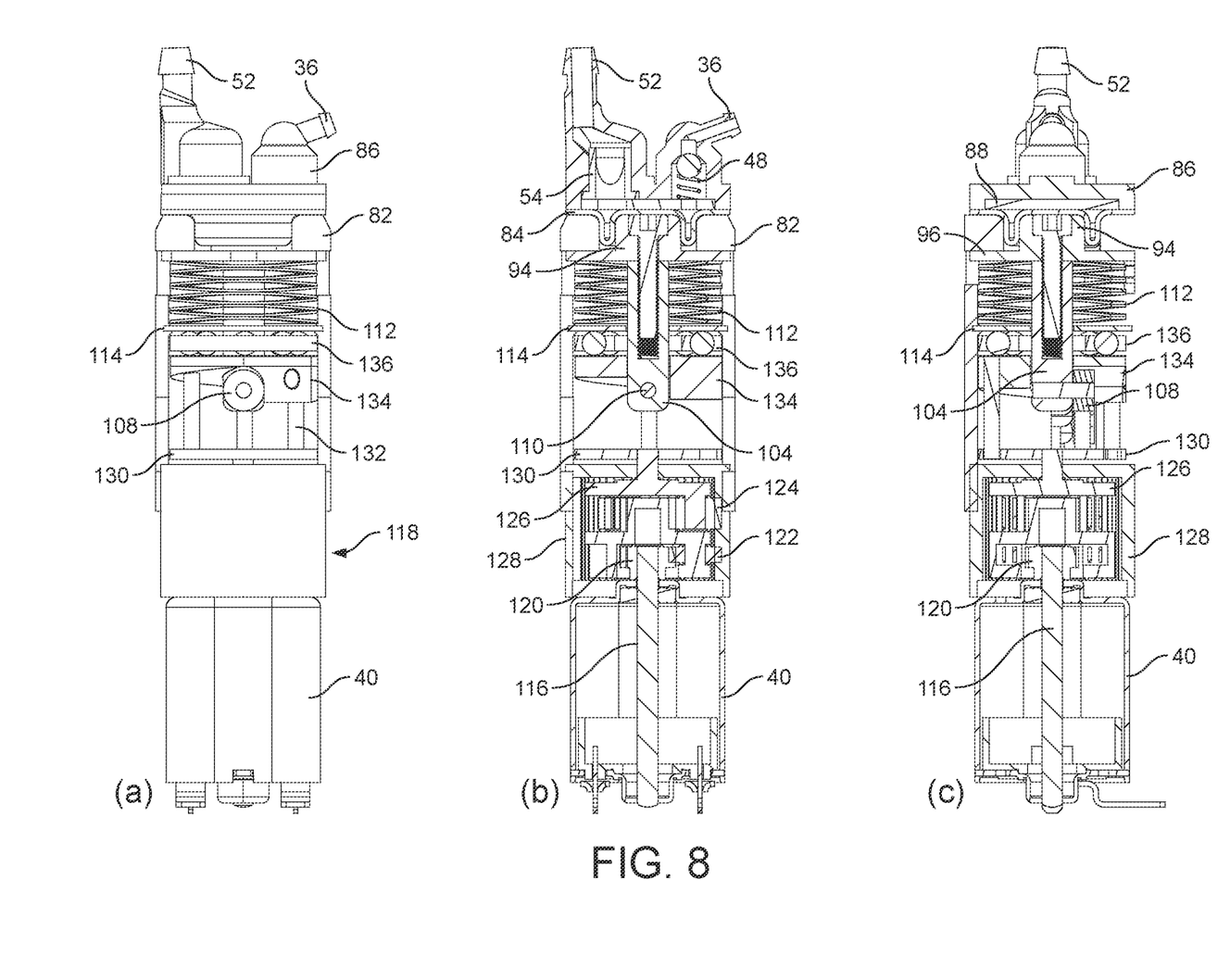
FIG. 8(a) is a side view of the pump assembly with part of the pump housing removed, with the cam follower located at the start of the ramp.
FIG. 8(b) is a front sectional view of the pump assembly of FIG. 8(a)
FIG. 8(c) is a side sectional view of the pump assembly of FIG. 8(a)
Figure 9:
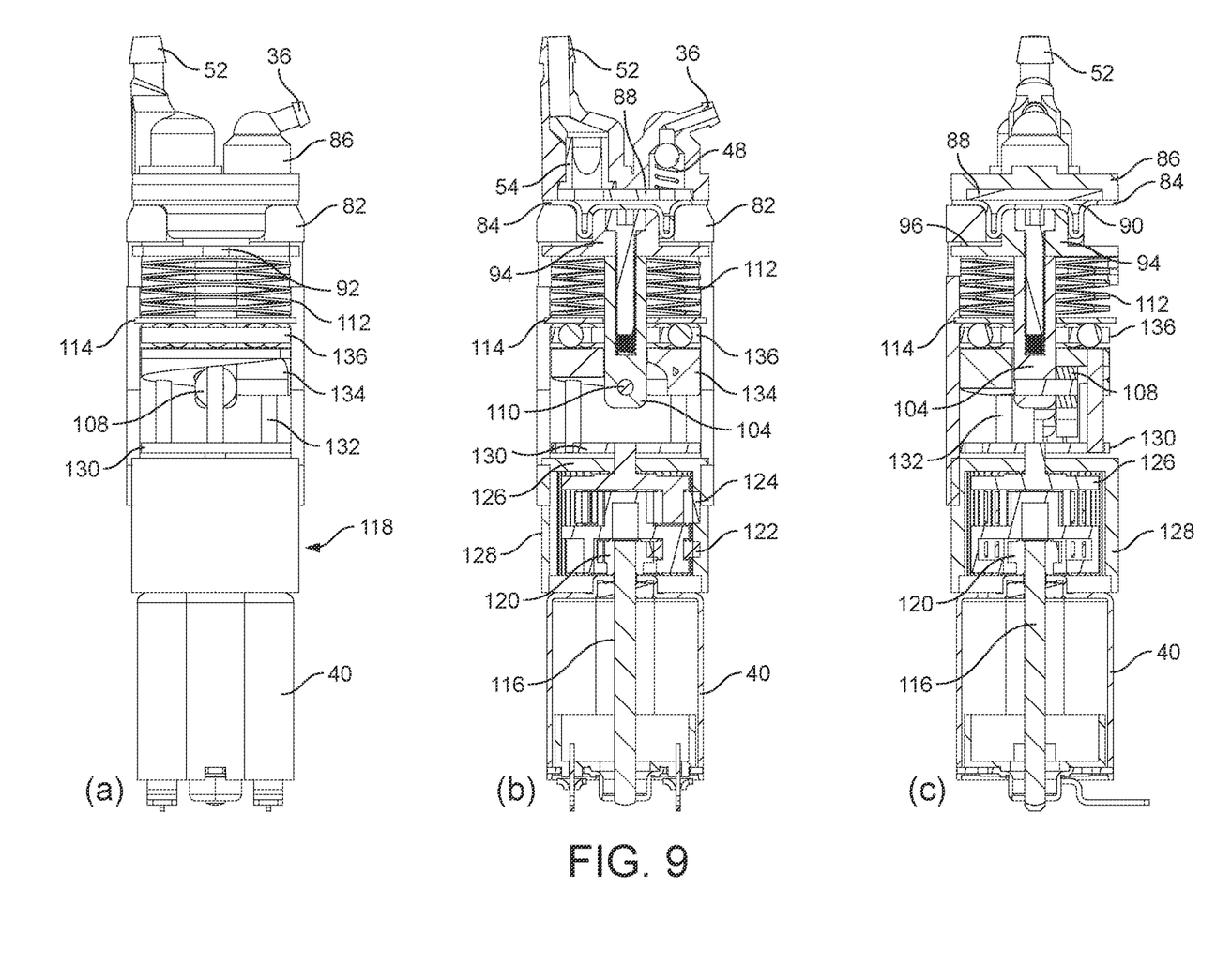
FIG. 9(a) is a side view of the pump assembly with part of the pump housing removed, with the cam follower located partway along the ramp.
FIG. 9(b) is a front sectional view of the pump assembly of FIG. 9(a)
FIG. 9(c) is a side sectional view of the pump assembly of FIG. 9(a)
Figure 10:
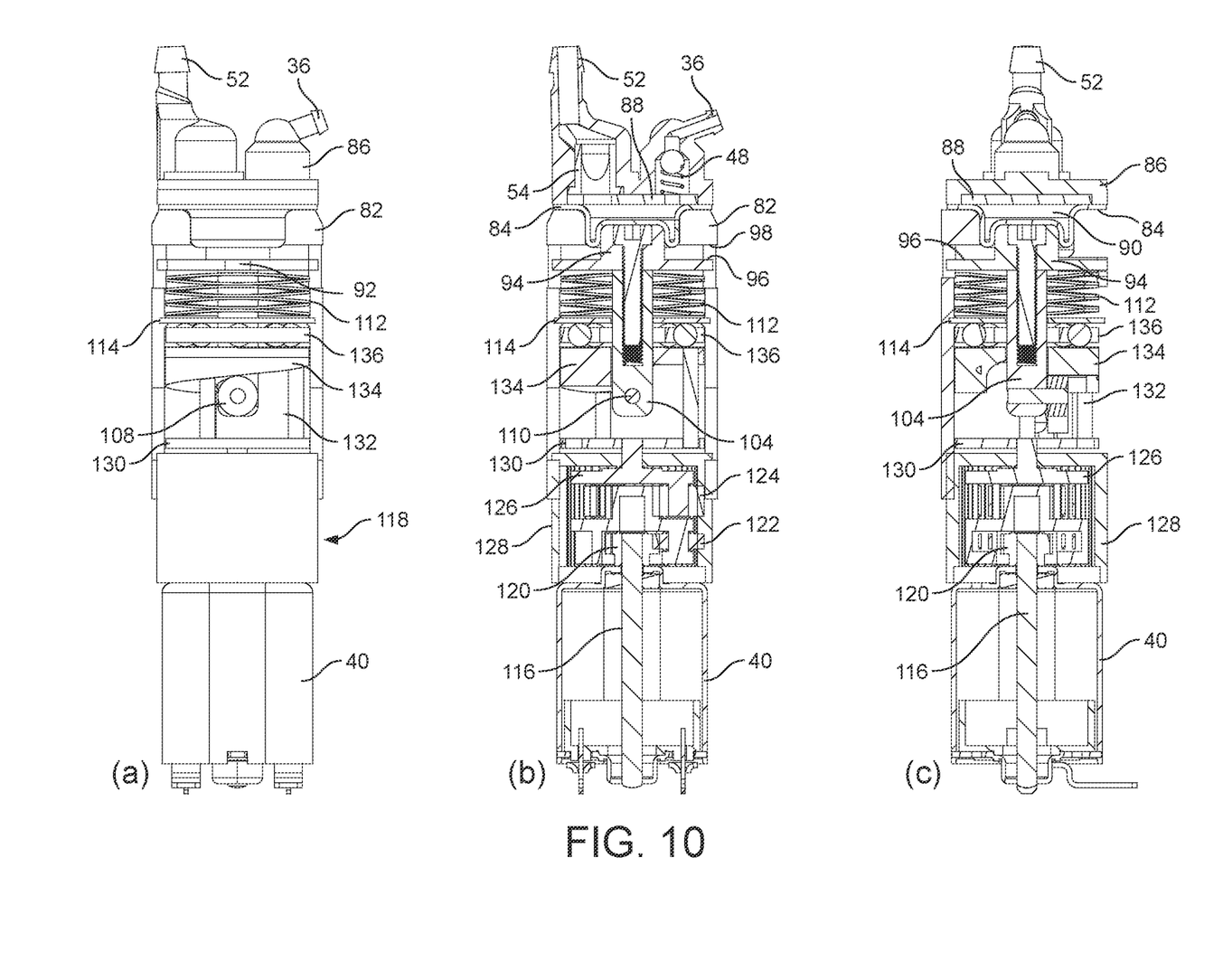
FIG. 10(a) is a side view of the pump assembly with part of the pump housing removed, with the cam follower located midway along the ramp.
FIG. 10(b) is a front sectional view of the pump assembly of FIG. 10(a)
FIG. 10(c) is a side sectional view of the pump assembly of FIG. 10(a).

FIGS. 8(*a*) to 8(*c*) illustrate an "unprimed" configuration of the pump assembly, which is adopted immediately following the ejection of the burst of fluid from the fluid chamber. There has been very little rotation of the cam 134 relative to the piston from the configuration shown in FIGS. 6(*a*) to 6(*c*). The cam follower 108 is now located at the start 140 of the ramp 138. The volume of the fluid chamber 90 is at a minimum; the cylindrical section of the rolling diaphragm 84 is sandwiched between the valve retainer 88 and the central portion 94 of the piston head 92, and the flange 96 of the piston head 92 is butted against the wall 98 of the pump housing. The spring 112 is located in an expanded configuration, but is sufficiently compressed so as to continue to apply a force to the piston which urges the cam follower 108 against the cam 134.

With continued rotation of the cam 134 about the piston, the cam follower 108 begins moving along the ramp 138 back towards the positon illustrated in FIGS. 5(a) to 5(c). FIGS. 9(a) to 10(c) illustrate configurations of the pump assembly which are adopted as the pump assembly is returned to its primed configuration. As the cam follower 108 moves along the ramp 138, the piston moves away from the valve retainer 88 against the biasing force of the spring 112, increasing the volume of the fluid chamber 90 and so causing working fluid to be drawn into the fluid chamber 90 through the fluid inlet 36. The spring 112 becomes compressed, converting kinetic energy into potential energy which is stored by the compressed spring 92. When the cam 134 has been rotated to the position illustrated in FIGS. 5(a) to 5(c), as detected by the control circuit 56 from the output of the sensor 152, the control circuit 56 stops the operation of the pump motor 40 to maintain the pump assembly in this primed configuration until the user operates the button 18 of the handle 12 again to actuate the delivery of a burst of working fluid from the nozzle 32. The time taken for the pump assembly to return to a primed configuration to eject a second burst of fluid after the user has operated the button 18 to eject the first burst of fluid is preferably in the range from 0.2 to 0.6 seconds, and is preferably around 0.3 seconds. This allows the pump assembly to be operated to eject bursts of fluid at a frequency of around 3 Hz.

The invention claimed is:

1. A pump assembly for a dental cleaning appliance, the pump assembly comprising:
   a positive displacement pump comprising a fluid chamber having a fluid inlet connectable to a source of fluid and a fluid outlet, and a fluid displacement member which is moveable in a linear direction relative to the fluid chamber;
   a drive for actuating the pump to draw fluid into the fluid chamber through the fluid inlet;
   an energy storage device for converting kinetic energy generated during actuation of the pump by the drive into potential energy, and storing the potential energy;
   a cam connected to the drive for rotation relative to the fluid displacement member, the cam comprising a ramp extending about the fluid displacement member, the ramp having an end which is spaced from a start of the ramp along said linear direction; and
   a cam follower connected to the fluid displacement member so as to engage the ramp;
   whereby, as the cam moves relative to the fluid displacement member, the cam follower (i) moves along the ramp to actuate the pump to draw fluid into the fluid chamber, and (ii) moves beyond the end of the ramp to enable the energy storage device to use stored potential energy to actuate the pump to urge a burst of fluid from the fluid chamber.

2. The pump assembly according to claim 1, wherein the energy storage device is arranged to apply a force to the fluid displacement member which biases the cam follower against the ramp.

3. The pump assembly according to claim 1, wherein the ramp faces away from the fluid chamber.

4. The pump assembly according to claim 1, comprising a control circuit for controlling the drive to stop the rotation of the cam at an angular position at which the fluid chamber is filled and the cam follower is located adjacent the end of the ramp.

5. The pump assembly according to claim 1, wherein the ramp comprises a relatively steep section which extends from the start of the ramp towards the end of the ramp.

6. The pump assembly according to claim 5, wherein the relatively steep section of the ramp has a substantially uniform gradient.

7. The pump assembly according to claim 1, wherein the ramp comprises a relatively shallow section located adjacent the end of the ramp.

8. The pump assembly according to claim 7, wherein the relatively shallow section of the ramp is substantially perpendicular to a rotational axis of the cam.

9. The pump assembly according to claim 7, wherein the drive is arranged to stop the rotation of the cam at an angular position at which the cam follower is located on the relatively shallow section of the ramp.

10. The pump assembly according to claim 1, wherein the start of the ramp is angularly spaced from the end of the ramp.

11. The pump assembly according to claim 1, wherein the cam follower comprises a circular bearing which is mounted on an axle extending perpendicular to a rotational axis of the cam.

12. The pump assembly according to claim 1, wherein the drive comprises a motor and a transmission connected between the motor and the cam.

13. The pump assembly according to claim 12, wherein the motor comprises a rotor which is rotatable about an axis which is collinear with a rotational axis of the cam.

14. The pump assembly according to claim 12, wherein the transmission comprises an epicyclic gearbox having an output which is connected directly to the cam.

15. The pump assembly according to claim 1, wherein the energy storage device is arranged to engage the fluid displacement member.

16. The pump assembly according to claim 1, wherein the energy storage device comprises a spring.

17. A dental treatment appliance comprising:
   a handle;
   a fluid reservoir for storing a working fluid; and
   a fluid delivery system for receiving the working fluid from the fluid reservoir, and for delivering of the working fluid to teeth of a user;
   wherein the fluid delivery system comprises the pump assembly according to claim 1.

* * * * *